Oct. 7, 1941.  J. J. GOUGH  2,257,906
TOASTER
Filed Aug. 8, 1940 4 Sheets-Sheet 3
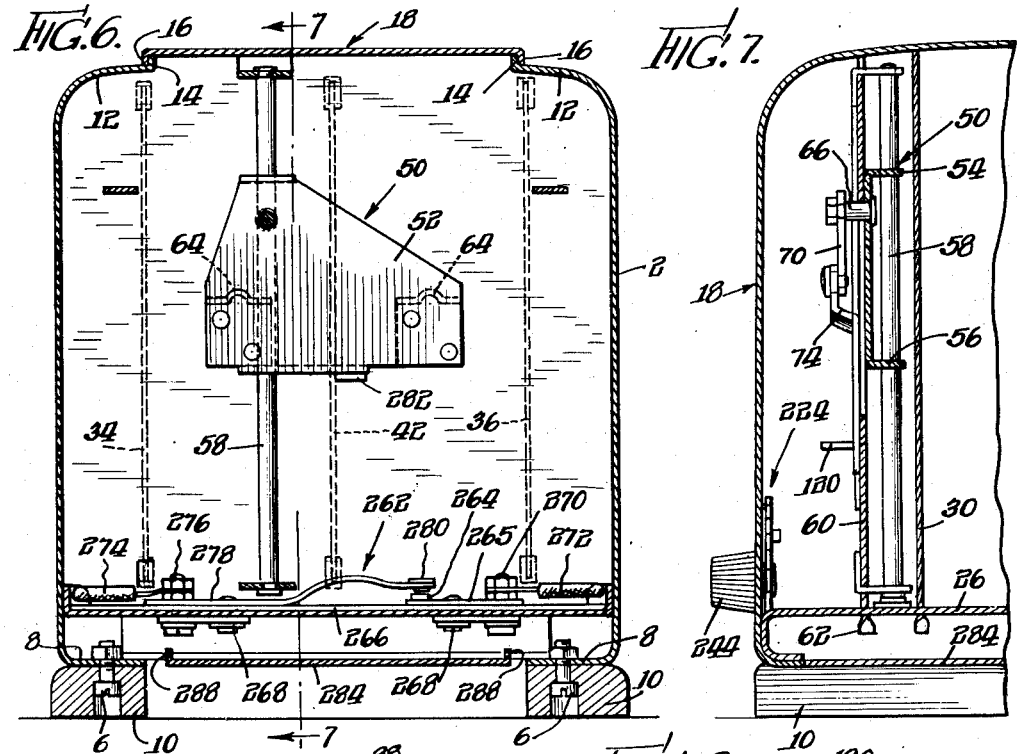
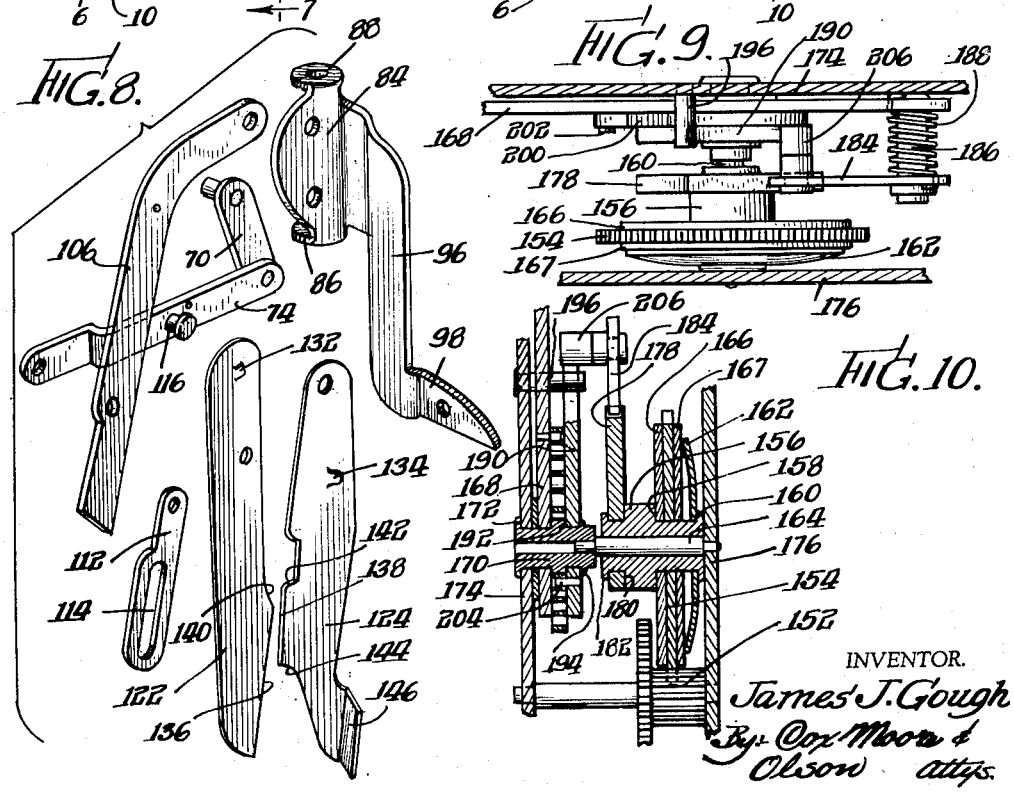
INVENTOR.
James J. Gough
By Cox, Moore & Olson attys.

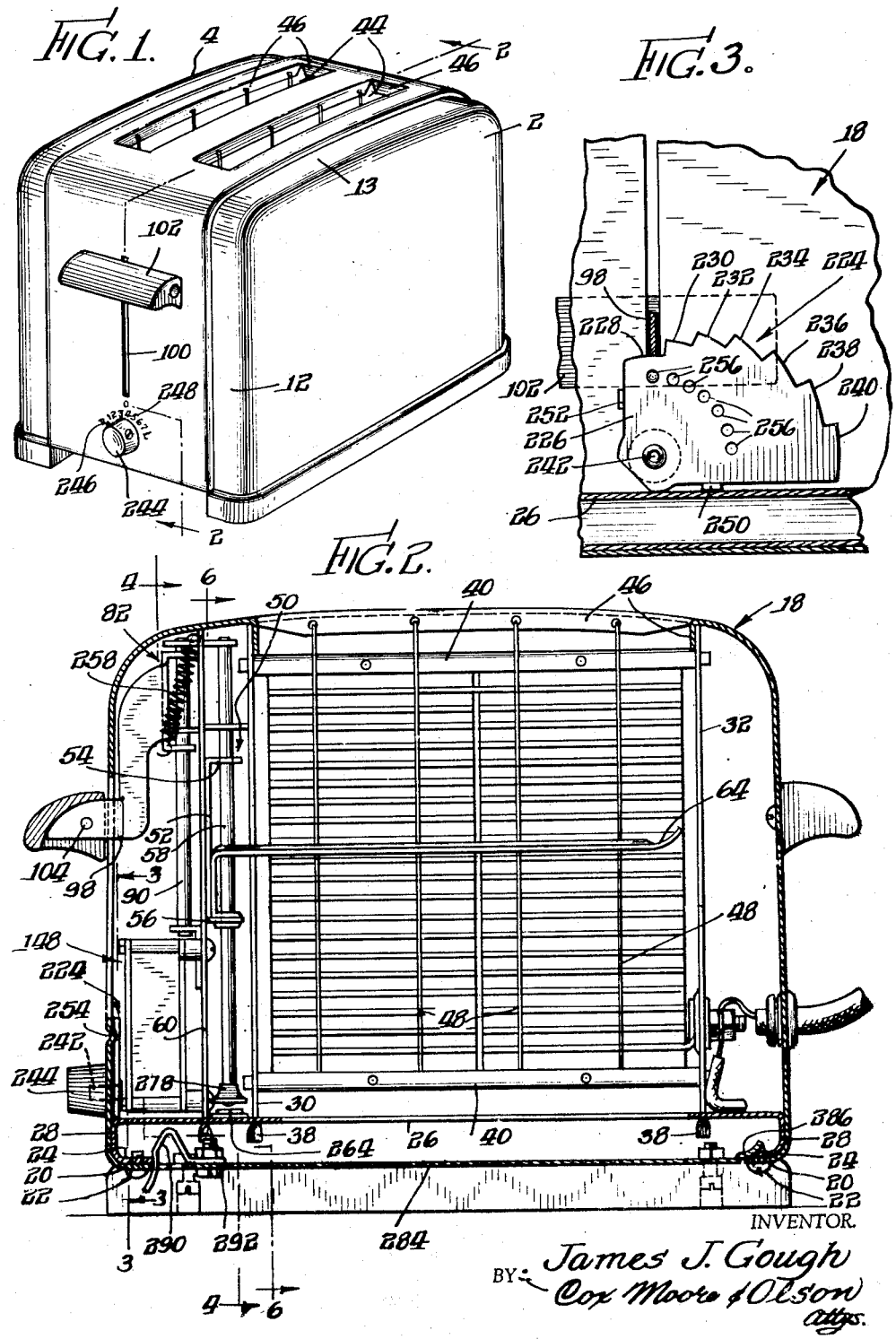
Oct. 7, 1941.  J. J. GOUGH  2,257,906
TOASTER
Filed Aug. 8, 1940  4 Sheets-Sheet 1
INVENTOR.
James J. Gough
BY Cox Moore & Olson
attys.

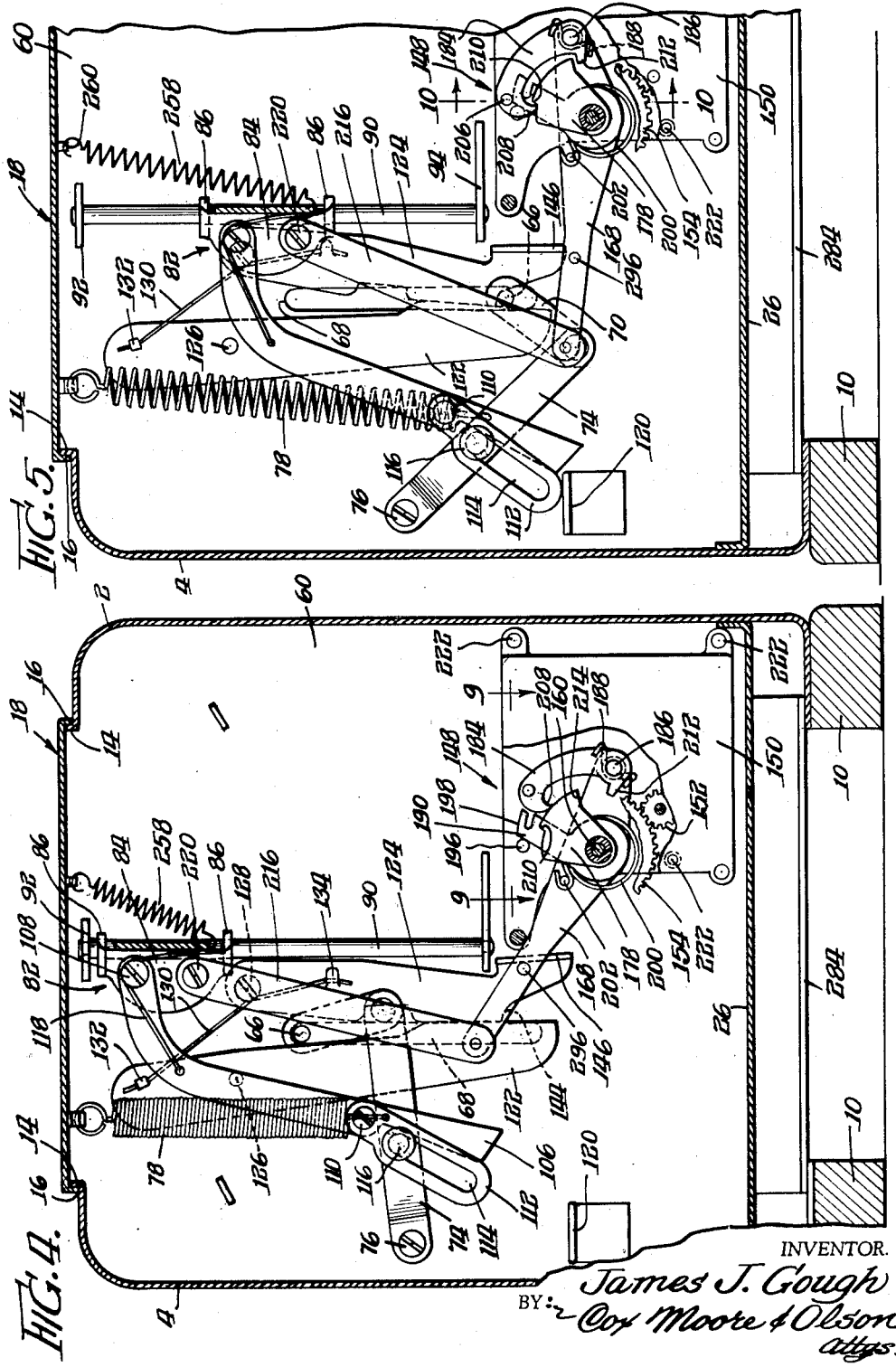

Oct. 7, 1941.　　　　　J. J. GOUGH　　　　　2,257,906
TOASTER
Filed Aug. 8, 1940　　　　4 Sheets-Sheet 4
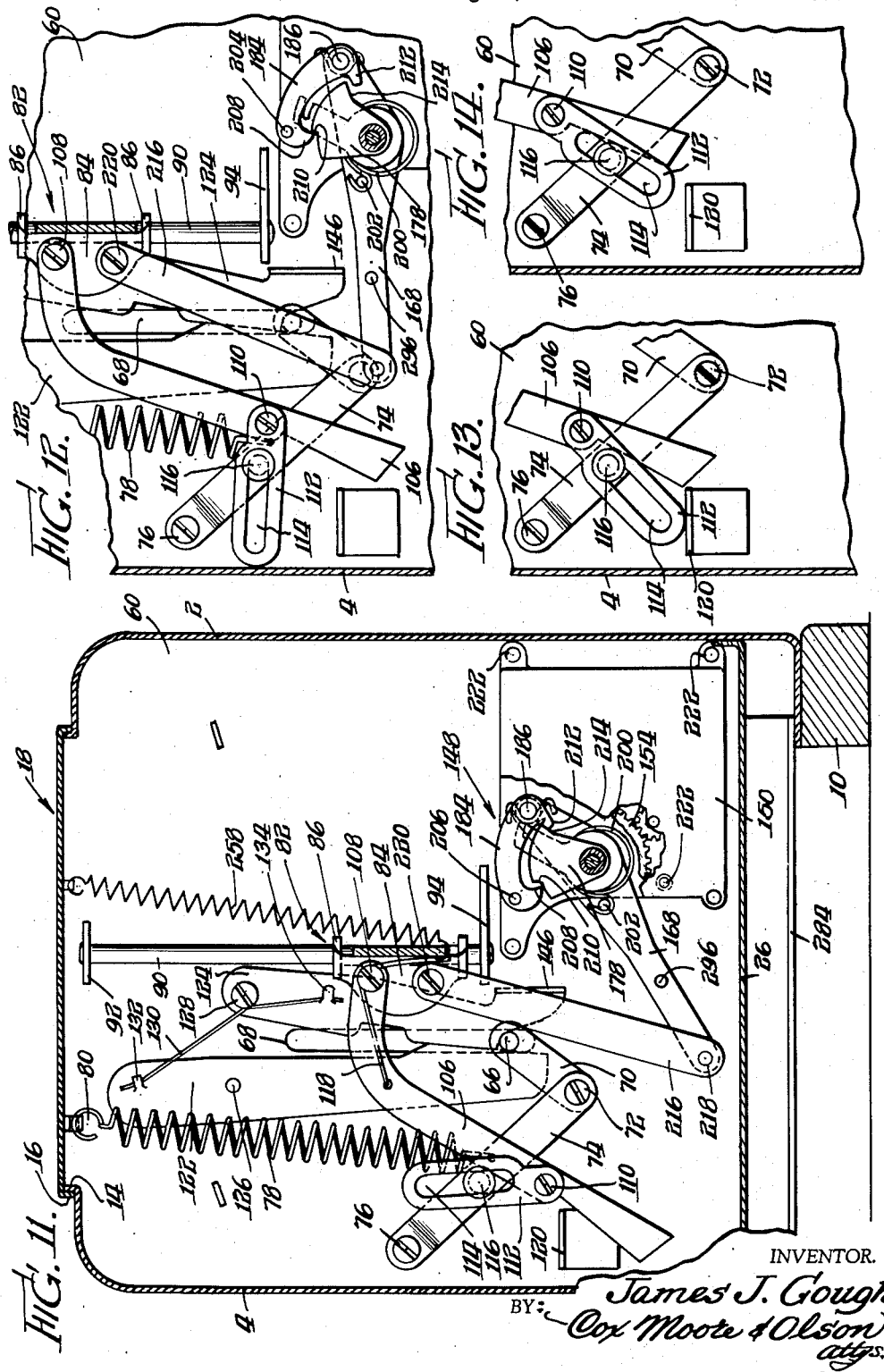
INVENTOR.
James J. Gough
BY Cox Moore & Olson
attys.

Patented Oct. 7, 1941

2,257,906

UNITED STATES PATENT OFFICE 2,257,906

TOASTER

James J. Gough, Chicago, Ill., assignor to Chicago Electric Manufacturing Company, Chicago, Ill., a corporation of Illinois Application August 8, 1940, Serial No. 351,875

16 Claims. (Cl. 161—16)

This invention relates to an electric toaster and has more particular reference to electric toasters of the type having a bread receiving tray or trays vertically shiftable to carry the bread between toasting elements.

An object of the invention is to improve the construction and decrease the cost of toasters of this type.

Another important object of the invention is to provide in a toaster of this type a timing mechanism and to provide a single manually operable member shiftable different distances determined by the setting of a timing control to simultaneously initiate a toasting operation and the operation of the timing mechanism.

A further object of the invention is to provide in a clock-controlled toaster of this type a manually operable mechanism which may be preset for the desired toast condition or toasting interval and which by controlling the distance of movement of the mechanism which initiates the toasting operation and the setting of the clock thereby determines the toast condition or the toasting interval.

Another object of the invention is to provide in a toaster of the above type a mechanism which permits manual manipulation of the member which shifts the article receiving tray or trays into toasting position to move the tray into non-toasting position at any time during a toasting operation.

Still another object of the invention is to provide in a toaster of the above type a single manually operable member which is movable different distances in accordance with the desired toast condition or toasting interval to energize the toasting elements and to effect the desired setting of the timing mechanism or control; and which is so connected with the article receiving tray or trays as to move the tray or trays the same distance to the same toasting position regardless of the distance through which the member moves to set the timing mechanism or control.

The invention also contemplates the provision of a casing construction for a toaster of this type wherein means is provided for creating an up-draft of air through the toasting chamber or chambers for insuring uniform toasting of each article and for minimizing the differences in the degree of toasting of successively toasted articles.

The invention also seeks to provide readily releasable crumb receiving means completely underlying the toasting chamber or chambers to form the bottom wall of such chamber or chambers and being spaced when in operative position from the casing or its partitions so as to provide ventilating openings insuring maintenance of the tray in a relatively cool condition and facilitating the creation of the up-draft of air through the toasting chamber.

Other and further objects and advantages of the invention will be apparent from the following description when taken in connection with the accompanying drawings, wherein:

Fig. 1 is a perspective view of a toaster embodying the invention;

Fig. 2 is an enlarged view in vertical section taken substantially along the line 2—2 of Fig. 1;

Fig. 3 is an enlarged fragmentary view in vertical section taken substantially along the line 3—3 of Fig. 2;

Fig. 4 is an enlarged fragmentary view in vertical section taken substantially along the line 4—4 of Fig. 2;

Fig. 5 is an enlarged fragmentary view similar to Fig. 4, but with the parts in a different position of operation;

Fig. 6 is a view in vertical section taken along the line 6—6 of Fig. 2;

Fig. 7 is a fragmentary view in vertical section taken substantially along the line 7—7 of Fig. 6;

Fig. 8 is an exploded view in perspective of the parts of the mechanism for shifting the toast tray or trays into toasting position and latching the tray or trays in said position;

Fig. 9 is a fragmentary enlarged view in horizontal section taken along the line 9—9 of Fig. 4;

Fig. 10 is an enlarged fragmentary view in vertical section taken substantially along the line 10—10 of Fig. 5;

Fig. 11 is a view similar to Fig. 4 with the parts in a different position of operation; and Figs. 12, 13 and 14 are fragmentary views diagrammatically illustrating operation of certain parts of the mechanism.

As shown in the drawings, the embodiment selected to illustrate the invention comprises a pair of pan-shaped, sheet metal stampings forming opposed side members 2 and 4 (Figs. 1 and 6). These side members are fastened in any convenient manner as by screws or bolts 6 passing through the bottom flanges 8 of the members 2 and 4 and received in spaced mounting bars 10 of any suitable heat insulating material whereby the toaster casing is spaced vertically from the surface or table upon which it is used. The relatively large space thus provided between these mounting bars 10 permits a substantial circulation of air beneath the casing to thus prevent overheating of the toaster supporting surface or table. The side and upper inturned flanges 12 and 13 of each side member are formed to provide upstanding flanges or beads 14 interlocking with the inturned peripheral flanges or beads 16 of a central substantially U-shaped sheet metal stamping or casing member 18. The interlocking of the flanges 14 and 16 secures the casing members 2, 4 and 18 against outward lateral displacement. At its lower ends the central casing member 18 is turned inwardly to provide flanges 20 fastened as by screws 22 to the inturned flanges 24 of a sheet metal plate 26 forming a bottom plate with a central opening therein for the toasting or heating chamber. The plate 26 is preferably formed with vertical peripheral flanges 28 integrally connecting the upper plate portion with the inturned flanges 24 so as to reenforce the bottom plate and to engage and hold the casing members 2, 4 and 18 against inward displacement.

The toasting or heating chamber is formed by the plate 26 in cooperation with the end plates or partitions 30 and 32 and the outer sheet-like heating elements 34 and 36 (Figure 6) which form the side walls of the heating chamber. The end plates 30 and 32 may be secured to the bottom plate 26 in any convenient manner, as, for example, by depending lugs 38 (Figure 2) extending through openings in the bottom plate and twisted for retention therein. The heating elements 34 and 36 may be of conventional structure secured between hanger bars or clips 40 having reduced end portions received in suitable apertures in the end plates 30 and 32. The heating chamber is preferably subdivided by a sheet-like heating element 42 (Figure 6) disposed centrally of the chamber and mounted an the end plates 30 and 32 in a manner similar to the outer heating elements 34 and 36.

The top of the toaster as formed by the central casing member 18 is provided with openings 44 (Figure 1) into the toast chamber or chambers. The edges of the openings 44 are defined by depending flanges 46, the longitudinally extending ones of which provide mounting means for the usual guard wires 48 which extend over the heating elements and prevent the toast from engaging such elements. At their lower ends the guard wires 48 may hang freely or may be secured to any suitable longitudinally extending mounting strip (not shown).

A toast carriage or tray 50 (Figures 2, 6 and 7) comprises a sheet metal plate 52 having perpendicular perforated aligned lugs 54 and 56 slidably mounting the toast carriage on a rod 58 extending vertically of the toaster casing and located between the partition 30 and a similar partition 60. The partition 60 extends between the side wall members 2 and 4 of the toaster casing and between the bottom plate 26 and the top wall of the casing. At its lower end the partition 60 may be secured to the bottom plate as by twisted lugs 62 and at its top edge the partition 60 may be secured in any convenient manner as by a sheet metal bracket (not shown) to the partition 30.

The toast carriage 50 carries toast receiving shelves or trays 64 passing through a suitable opening or openings in the partition 30 and into the toasting chambers. At their outer ends the sheet metal bars forming the shelf members 64 are bent downwardly and spot-welded or otherwise fastened to the plate 52. An operating latch pin 66 secured to the plate 52 extends through a slot or opening 68 (Figure 4) in the partition 60 and has pivoted thereto at its outer end a link 70. The link 70 is in turn pivoted as by the pin or screw 72 to the free end of the lever 74 pivoted as by the pin or screw 76 to the outer face of the partition plate 60. The toast carriage is urged into non-toasting position by means of a coil spring 78 having one end secured to an intermediate point on the lever 74 and the other end secured to a lug or pin 80 on the partition 60.

Movement of the toast carriage to toasting position is effected by a manually operable carriage mechanism 82. The carriage mechanism 82 comprises a sheet metal carriage 84 (Figure 8) having laterally bent opposed perforated lugs 86 and 88 slidably received on a rod 90 secured to lugs or brackets 92 and 94 struck out from or fastened to the partition plate 60. The carriage 84 is formed integrally with an operating arm 96 terminating in a forwardly projecting finger 98 passing through a slot 100 (Figure 1) in the forward wall of the toaster formed by the central casing member 18. A knob or the like 102 is secured as by a screw 104 to the finger 98.

The carriage 84 is connected to the lever 74 through a linkage comprising a link 106 pivoted at one end as by the screw 108 to the carriage 84 and intermediately as by a pin or screw 110 to a link or lever 112 having an elongated slot 114 receiving the shank of a headed pin 116 fastened to the lever 74 intermediate of its ends. A spring 118 coiled about the pin or screw 108 is secured at one end to the link 106 and bears at its other end against the operating arm of the carriage 84. The spring urges the link 106 in a counter-clockwise direction as seen in Figures 4, 5, and 11 to 14. Counter-clockwise movement of the link 106 is limited by the pin 116 and at times by a lug or bracket 120 struck from or secured to the partition plate 60.

The toast carriage 50 is latched in toasting position by latch levers or plates 122 and 124. The latch lever 122 is pivoted intermediate its ends as by a pin 126 to the outer surface of the partition plate 60 and the latch lever 124 is pivoted at its upper end as by the pin or screw 128 to the outer surface of the partition plate 60. A spring 130 coiled about the pin or screw 128 is secured at one end as by the lug 132 to the upper end of the latch lever 122 and secured at its other end as by the lug 134 intermediate the ends of the lever 124 and normally urges the latch levers toward each other and into abutting relation overlying the slot 68. The lower longitudinal edge portions 136 and 138 of the latch levers are normally held by the spring 130 in abutting relation and above these abutting edges the latch lever 122 is provided with a rounded camming edge 140 and the latch lever 124 with a rounded camming edge 142 so that upon engagement of these edges by the latch pin 66 and the toast carriage 50 the latch levers 122 and 124 will be moved apart against the urge of the spring 130 to permit the latch pin to move therebetween.

The latch lever 124 is cut away in its lower portion to provide a latch shoulder 144 for engaging over the latch pin 66 when the toast carriage 50 is in its lowest position thereby to hold or latch the carriage in this toasting position. The latch lever 124 is also provided in its lower portion with a laterally bent lug or flange 146 providing an operating portion for releasing the latch lever 124 from the latch pin 66.

A timing mechanism 148 (Figures 2, 4, 5 and 9 to 11) comprises a clock controlled mechanism 150, which may be of any conventional structure providing a timing gear 152 (Figure 4). The gear 152 meshes with a gear 154 journaled on a sleeve 156 between the shoulders 158 and 160.

A bowed, resilient washer 162 secured to the sleeve 156, which is secured to the shaft 164, urges the gear 154 into face-to-face frictional driving engagement with washers 166 and 167, keyed to or frictionally assembled with the sleeve 156 to cause a rotation of the sleeve when the gear 154 is drivingly controlled by the timing gear 152. A latch-setting lever 168 (Figures 4, 5 and 9 to 14) is journaled on a hollow bushing 170. The bushing 170 has its outer end peened over as at 172 into locking engagement with the surface of the mounting plate 174. The shaft 164 has its opposite, reduced end portions journaled in the bushing 170 and in the mounting plate 176. The bowed, resilient washer 162 may be secured to the sleeve 156 by peening over the shoulder 160 into the surface of the washer and also by providing the washer with a center aperture having a flat edge mating with a similarly flattened edge portion of the periphery of the sleeve 156. Latch keeper 178 is secured to the sleeve 156 between a shoulder 180 and peened-over end 182 of the sleeve. The lever 168 at one end carries a latch 184 pivoted thereto as by a pin 186. The latch 184 is normally urged in a counterclockwise direction, as seen in Figures 4, 5, 11 and 12, and relative to the latch-setting lever 168 by a spring 188 coiled about the pin 186 and secured at its opposite ends to the lever 168 and the latch 184. A cam 190 for releasing the latch 184 from the keeper 178 is fastened to the bushing 170, being secured thereto between the shoulder 192 and the peened-over shoulder 194. A pin 196 projecting from the mounting plate 174 abuts an edge of the cam 190 to prevent the forces imposed on the cam during the setting of the time controlling mechanism from tending to loosen the cam from the bushing 170. The cam face 198 (Figure 4) of the cam 190 is formed as a surface of constantly increasing radius from the axis of the shaft 164 and bushing 170 in the clockwise direction of rotation of the gear 154, the keeper 178, and the latch-setting lever 168, as seen in Figures 4, 5, 11, and 12. The latch-setting lever 168, the latch 184, the keeper 178 and the gear 154 are urged in a clockwise direction, as seen in said figures, by a coil spring 200 having one end secured as by pin 202 (Figure 4) to the latch-setting lever 168, and its opposite end secured as by pin 204 (Figure 10) to the stationary cam 190. The latch 184 carries adjacent its free end a pin 206 adapted to extend over and engage the cam face 198 of the cam 190, and is also provided at the free end with a latching nose 208 engageable with a radial shoulder 210 of the keeper 178. At its opposite end, latch 184 is provided with a tail piece 212 which is adapted to engage the radial edge 214 of the keeper so as to move the keeper in a counterclockwise direction, as seen in Figures 4, 5, 11 and 12, when the latch-setting lever 168 is moved in such a counterclockwise direction. The latch-setting lever 168 is connected to the manually operable carriage 84 by a link 216 pivotally secured at one end to the lever as by the pin or screw 218 and at its other end pivotally secured as by the pin or screw 220 to the carriage 84.

The timing or time-controlling mechanism 148 may be mounted in any convenient manner on the partition plate 60 as, for example, by the screws or bolts 222 passing through the partition plate 60 and received in internally threaded mounting lugs carried by the mounting plate 174.

Adjustable means 224 (Figs. 2 and 3) is provided for limiting the movement of the manually operable carriage mechanism 82 to determine the presetting of the timing mechanism 148 and thereby determine the length of the toasting interval. This means comprises a sheet metal plate or disc 226 having a plurality of angularly spaced, radially offset, peripheral edge portions 228 to 240 (Fig. 3). The disc or plate 226 is secured to one end of a stud 242 passing through an aperture in the forward wall of the toaster and having fastened to its projecting end an operating knob 244. The knob 244 is of course provided with the usual pointer portion 246 (Fig. 1) cooperating with indicia 248 inscribed in the forward wall of the toaster casing or in a convenient plate fastened to this wall.

Angular adjustment of the plate 226 is limited by engagement of lugs 250 and 252 (Fig. 3) with the bottom plate 26 of the toaster casing. The plate 226 is mounted in face-to-face abutting relation with the inner surface of the forward wall of the toaster casing and is frictionally held in each of its adjusted positions by an inwardly struck protuberance or lug 254 (Fig. 2) engageable with each of a series of angularly spaced depressions or notches 256 in the forward surface of the plate 226.

Upon angular adjustment of the disc or plate 226, a selected peripheral edge portion 228 to 240 of the plate is brought into alignment with the slot 100 in the forward wall of the toaster casing and in position to engage the lower edge of the forwardly projecting finger 98 of the carriage 84 and thereby limit or determine the distance of the downward movement of the manually operable carriage mechanism 82. It will be evident that the peripheral edge portion 228 of minimum radius allows the greatest downward movement of the carriage 84 and consequently the greatest counterclockwise rotation of the latch-setting lever 168 and the keeper 178 relative to the cam 190. Hence, with the means 224 adjusted to the position shown in Fig. 3, the toaster will be set for the longest toasting interval.

It will be further evident that the peripheral edge portion 240 of maximum radius determines the minimum downward movement of the carriage 84 and hence the minimum counter-clockwise movement of the latch-setting lever 168 and the keeper 178 relative to the cam 190. Hence, with the peripheral edge portion 240 of the disc or plate 226 aligned with the slot 100 and in the path of movement of the finger 98 of the carriage 84, the toaster will be set for the minimum toasting interval. The peripheral edge portions 230 to 238 will, of course, determine settings of the toaster for different toasting intervals intermediate the minimum and maximum.

Upward movement of the manually operable carriage mechanism is effected by a coil spring 258 (Figs. 2, 4, 5 and 11) secured at one end to the lower lug 86 of the carriage 84 and at its other end to a lug 260 struck from the partition plate 60.

Switch mechanism 262 (Fig. 6) automatically energizes the heating elements when the toaster carriage 50 is moved into toasting position, and automatically de-energizes the heating elements as the toaster carriage moves from toasting position toward the non-toasting position. This switch mechanism 262 comprises a fixed contact 264 carried by a conductor strap 265 (Figs. 2 and 6) located between the partition plates 30 and 60 and insulatingly mounted on the bottom plate 26 as by the insulating strap or bar 266 (Fig. 6) and insulated bolts 268. The conductor strap 264 carries a terminal 270 by which the fixed contact is connected to a supply wire 272. The other supply wire, not shown, is connected to one end of the heating elements, which are connected in series, and the other end of the elements is connected by a wire 274 to a terminal 276 connected to resilient conductor strap 278 carrying movable contact 280. The conductor strap 278 is positioned between the partition plates 30 and 60 in a position to be engaged and moved downwardly by an insulating bushing 282, carrier by the lug 56 of the carriage plate 52. Thus it will be evident that when the toaster carriage 50 is moved to its lower, toasting position, the movable contact 280 is moved by the insulating bushing 282 into engagement with the fixed contact 264 and thereby completes the circuit to the heating elements of the toaster. Similarly, as the toast carriage moves from its lower toasting position under the urge of the spring 78 to its non-toasting position, the conductor strap 278 is released and, due to its resiliency, snaps the contact 280 out of engagement with the fixed contact 264, thereby de-energizing the heating elements of the toaster.

A crumb-receiving tray 284 (Figs. 2 and 6) comprises a sheet metal plate having a rear offset flange portion 286 resting upon the inturned bottom flanges 22 and 24 of the casing section 18 and the plate 26. The crumb tray 284 substantially completely closes the bottom of the toasting chamber or chambers and underlies the opening in the bottom plate 26. The opposite longitudinal edges of the tray 284 are turned upwardly as at 288 (Fig. 6) so that the tray is shaped in the form of a shallow pan of a width less than the space between the bars 10 to permit the full free circulation of air through the toasting chamber or chambers so that the heat of the toaster may be readily dissipated between successive toasting operations for insuring uniform toasting of each article and for minimizing the difference in the degree of toasting of successively toasted articles.

A resilient clip 290 is secured to the forward edge of the tray 284 as by the bolt 292, the clip resiliently engaging the free edge of the forward flanges 20 and 24 to latch the tray in its normal position. The clip 290 extends beneath the flange 20 to provide a finger piece 294 by which the clip may be released for the ready detachment of the crumb-receiving tray.

The operation of applicant's toaster is as follows:

The toast carriage 50 being in its upper, non-toasting position, in which it is held by the spring 78, is moved downwardly by manipulation of the knob or handle 102 of the manually operable carriage mechanism 82. When the toast carriage is in the non-toasting position, the pin 116 is at the upper end of the slot 114 as shown in Fig. 4. Hence, as the manually operable carriage mechanism 82 is moved downwardly, the link 106 moves downwardly and the slotted lever 112 through the pin 116 swings the lever 74 in a clockwise direction as seen in Figs. 4 and 5 to the position shown in Fig. 5. At the same time the carriage 84, in its downward movement through the link 216 swings the latch setting lever 168 in the counterclockwise direction to the position shown in Fig. 5, in which position the nose 208 of the latch 184 engages with the latching shoulder 210 of the keeper 178.

In the position of the parts shown in Fig. 5, the toast carriage has been moved to its fully lowered toasting position and the latch pin 66 of the toast carriage lies under the latching shoulder 144 of the latch lever 124. If it be assumed that the adjustable means 224 for determining the toasting interval has been set for a minimum period, the edge portion 240 of the disc or plate 226 will extend beneath the finger 98 of the carriage 84 and hence downward movement of the carriage is stopped when the parts are in the position shown in Fig. 5. Under the urge of the spring 200 and controlled by the clock mechanism 150, the gear 154 rotates in a clockwise direction as seen in Fig. 5.

Accordingly the keeper 178, the latch 184, and the latch setting lever 168 also move in a clockwise direction and in so moving, permit upward movement of the carriage 84. As the carriage 84 moves upwardly the link 106 also moves upwardly as permitted by the slot and pin connection between the lever 112 and the lever 74, which at this time is held against movement by the latch lever 124. When the latch 184 has been rotated to a predetermined position relative to the cam 190, the cam edge or face 198 causes the latch to swing relative to the latch setting lever 168 about the pin 186 and thereby frees the nose 208 of the latch 184 from the shoulder 210 of the keeper 178. The springs 200 and 258 then cause a sudden further clockwise movement of the latch setting lever and snap a pin 296 carried by the latch setting lever into engagement with the operating finger or lug 146 of the latch lever 124 and snap this lever into latch releasing position and the toaster carriage moves rapidly upward from its lower toasting position to its upper non-toasting position under the control of the spring 78.

It will therefore be seen that the toaster carriage is released with a snap action and therefore the switch mechanism 262 is also released with a snap action as the toaster carriage is released from the latching lever 124. The lever 122 which is always maintained in abutting relation with the latch lever 124 insures proper positioning of this latch lever for engagement and release of the latch pin 66 of the toast carriage and permits use of a light spring 130, thereby equalizing lateral forces on the toast carriage which in prior toasters has caused excessive wear and prevented proper operation of the toast carriage.

If it is desired to interrupt a toasting operation at any instant during the toasting interval, it is merely necessary to push upwardly upon the knob or handle 102. Upward manual movement of the handle 102 causes an upward movement of the carriage 84 and a clockwise rotation of the latch setting lever 168 so that the pin 296 is brought into engagement with the finger or lug 146 of the latch lever 124, thereby releasing the toast carriage as previously described. This clockwise movement of the latch setting lever 168 causes clockwise movement of the latch 184, the keeper 178, the sleeve 156 (Figs. 9 and 10), and the washers 162, 166 and 167, the gear 154 being, however, retained against movement by the escapement control clock mechanism. It will be evident that this manual release or interruption of the toasting operation at any instant is permitted by the friction drive coupling between the gear 154 and the latch keeper 178.

When the adjustable means 224 for determining the toasting interval is set in the position shown in Fig. 3 wherein the peripheral edge portion 228 of the disc or plate 226 determines the limit of movement of the manually operable carriage mechanism 82, initial movement of this carriage mechanism will cause downward movement of the toast carriage to its toasting and latched position and further downward movement of the carriage mechanism will move the parts to the position shown in Figure 11. As seen from this figure, the latch setting lever 168, and hence the latch 184 and the keeper 178 (through the tail piece 212 of the latch 184), have been moved a greater distance in a counter-clockwise direction so that a greater time will necessarily elapse before the pin 206 of the latch will engage and be operated by the cam edge or face 198 of the stationary cam 190.

It should further be noted that when the toast carriage has been moved to its lower toasting position, the lower edge of the slotted lever 112 contacts the lug 120, as seen in Fig. 5, and this lug causes the lever 112 to swing or pivot about the pin 116 as the link 106 continues to move downwardly with the carriage 84. The spring 118 holds the link 106 in such position that the pin 116 continues to remain at the same end of the slot 114 and the lever 112 therefore continues to swing about the pin 116 after leaving the lug 120 until the lever has reached a substantially vertical position, as seen in Fig. 11, and further downward movement of the link 106 causes the lever 112 to move downward relatively to the pin 116. This movement of the parts insures a full free movement of the carriage mechanism 82 without binding of the parts. As the carriage mechanism 82 rises under the control of the timing mechanism 148, the link 106 and the lever 112 move in an opposite direction to the various positions shown in Figs. 12 to 14. Thus when the carriage mechanism and the link 106 have moved upwardly so that the pin 116 is again at the end of the slot 114, the lever 112 swings about this now stationary pin as shown in Fig. 12 until it reaches the position shown in Fig. 13, in which at its lower edge it abuts or contacts the lug 120, as shown in Fig. 13, and further upward movement of the carriage mechanism 82 and the link 106 now causes the lever to cease swinging about the pin 116 and move upwardly relative to the pin through the position shown in Fig. 14. When the lever has been moved upwardly so that the pin 116 approaches the other end of the slot 114, the carriage mechanism 82 will be released by the timing mechanism, as previously described, and the levers 112 and 74 will move upwardly simultaneously.

At various intermediate settings of the disc or plate 226, the manipulation of the carriage mechanism 82 will similarly first cause the parts to be moved to the position shown in Fig. 5 in which the toast carriage is latched in its toasting position, and then cause the desired additional setting movement of the latch setting lever 168; the link 106 and lever 112 assuming intermediate positions such as shown in Figs. 12 to 14.

It will be seen from the foregoing description that applicant has provided an electric toaster of the type having a bread receiving tray or trays vertically shiftable to carry the bread between toasting elements and which has improved the construction of toasters of this type for manufacture at a decreased cost.

The invention has also provided in a toaster of this type a timing control and a single manually operable member shiftable different distances determined by the setting of the timing control to simultaneously initiate a toasting operation and the operation of the timing control.

Applicant has further provided in a clock-controlled toaster of this type a manually operable mechanism which may be preset for the desired toast condition or toasting interval and which by controlling the distance of movement of the mechanism which initiates the toasting operation and the setting of the clock can thereby determine the toast condition or the toasting interval.

The invention has further provided in a toaster of the above type a mechanism which permits manual manipulation of the member which shifts the article receiving tray or trays into toasting position to move the tray into non-toasting position at any time during a toasting operation.

Applicant has further provided in a toaster of the above type a single manually operable member which is movable different distances in accordance with the desired toast condition or toasting interval to energize the toasting elements; which has effected the desired setting of the timing mechanism or control; and which is so connected with the article receiving tray or trays as to move the tray or trays the same distance to the same toasting position regardless of the distance through which the members move to set the timing mechanism or control.

The invention has also provided a casing construction for a toaster of this type wherein means is provided for creating an up-draft of air through the toasting chamber or chambers for insuring uniform toasting of each article and for minimizing the differences in the degree of toasting of successively toasted articles.

The invention has also provided readily releasable crumb-receiving means completely underlying the toasting chamber to form the bottom wall of such chamber or chambers and being spaced when in operative position from the casing or partitions so as to provide ventilating openings insuring maintenance of the tray in a relatively cool condition and facilitating the creation of the up-draft of air through the toasting chamber.

The invention is hereby claimed as follows:

1. In an electric toaster, a casing, an article receiving tray shiftable from a non-toasting position to a toasting position relative to said casing, means for latching said tray in toasting position, operating means adapted to engage the latching means when operated in one direction to release said latching means, time control means locking said operating means out of operative engagement with said latching means and releasing said operating means after a predetermined time for operative engagement with said latching means to move said latching means into a released position, said operating means including means for setting said time control means into operation when said operating means is moved in the opposite direction, and manually operable means movable an initial fixed distance to shift said tray to the toasting position and movable additional varying distances to move said operating means in said opposite direction to preset said time control means.

2. In an electric toaster, a casing, an article receiving tray shiftable from a non-toasting position to a toasting position relative to said casing, means for latching said tray in toasting position, operating means movable in one direction to release said latching means, time control means controlling the movement of said operating means in said one direction, said operating means being movable in the opposite direction to set said time control means, means connecting said tray to said operating means for moving said operating means in said opposite direction upon shifting of the tray to toasting position, and means for adjustably determining the distance of movement of said operating means in said opposite direction to predetermine the time setting of said time control means.

3. In an electric toaster, a casing, an article receiving tray shiftable from a non-toasting position to a toasting position relative to said casing, means for latching said tray in a toasting position, operating means movable in one direction to engage the latching means to release said latching means, time control means controlling the movement of said operating means in said one direction, said time control means including means for locking said operating means out of engagement with said latching means, fixed means engaging and releasing said locking means after a predetermined time interval to release said operating means for operative engagement with said latching means to move said latching means into a released position, said operating means being movable in the opposite direction to set said time control means, and means for adjustably determining the distance of movement of said operating means in said opposite direction to predetermine the time setting of said time control means.

4. In an electric toaster, a heating element, a casing, an article receiving tray shiftable from a non-toasting position to a toasting position relative to said casing and said heating element, means for latching said tray in toasting position, switch means controlling the energization of said heating element, operating means adapted to engage the latching means to release said latching means, time control means locking said operating means out of engagement with said latching means and releasing said operating means after a predetermined time for operating engagement with said latching means to move said latching means into a released position, manually operable means for moving said tray into toasting position, a connection between said manually operable means and said operating means for actuating said operating means into locking relation with said time control means simultaneously with the movement of the tray to toasting position, and means for operating said switch means upon movement of the tray into toasting position to energize the heating element and operable upon movement of the tray toward non-toasting position to deenergize the heating element.

5. In an electric toaster, a casing, an article receiving tray, a rectilinearly shiftable carriage carrying said tray between non-toasting and toasting positions relative to the casing, means urging said carriage and tray into non-toasting position, means for latching said carriage and tray in toasting position, latch releasing mechanism, timing mechanism controlling said latch releasing mechanism, and manually operable means movable an initial fixed distance to shift said carriage and tray to the toasting position and movable additional varying distances to set said time control means thereby to determine the toasting interval.

6. In an electric toaster, a casing, an article receiving tray shiftable from a non-toasting position to a toasting position relative to said casing, means for latching said tray in toasting position, timing mechansm, latch releasing mechanism, releasable means for connecting said latch releasing mechanism to said timing mechanism, manually operable means, means connecting said manually operable means to said tray for causing said tray to move to toasting position upon operation of the manually operable means, means connecting said manually operable means to said timing mechanism to pre-set said mechanism, the said means connecting said manually operable means to the tray including a lost motion connection whereby the manually operable means may be moved an initial fixed distance to move the tray into toasting position and thereafter moved additional varying distances to adjustably pre-set said timing mechanism.

7. In an electric toaster, a casing, an article receiving tray shiftable from a non-toasting position to a toasting position relative to said casing, means for latching said tray in toasting position, timing mechanism, latch releasing mechanism, releasable means for connecting said latch releasing mechanism to said timing mechanism, manually operable means, means connecting said manually operable means to said tray for causing said tray to move to toasting position upon operation of the manually operable means, means connecting said manually operable means to said timing mechanism to preset said mechanism, the said means connecting said manually operable means to the tray including a lost motion connection whereby the manually operable means may be moved an initial fixed distance to move the tray into toasting position and thereafter moved additional varying distances to adjustably preset said timing mechanism, and adjustable means for determining the extent of movement of said manually operable means.

8. In an electric toaster, a casing, a manually operable slice receiving holder shiftable from a non-toasting to a fixed toasting position relative to the casing, means for latching said holder in toasting position, means for returning said holder to non-toasting position upon release of said latching means, latch releasing mechanism, timing mechanism, means operated by said latch releasing mechanism upon movement in one direction for setting said timing mechanism and releasably connecting said timing and latch releasing mechanism, said latch releasing mechanism being movable in the opposite direction under the control of said timing mechanism, manually operable means connected to said latch releasing mechanism and movable different distances to move said latch releasing mechanism in said one direction, adjustable means for determining the extent of movement of said manually operable means, and means connecting said manually operable means to said holder for causing said carriage to be shifted to the fixed toasting position upon operation of the manually operable means independent of the adjustment of said adjustable means.

9. In an electric toaster, heating means, a slice support shiftable between non-toasting and toasting position relative to said heating means, means for maintaining said heating means normally deenergized and the slice support in non-toasting position, latching means for securing said slice support in toasting position, time controlled latch releasing mechanism for operating said latching means to release the slice support, a single manually operable member movable different distances to pre-set said time controlled mechanism and means actuated by said manually operable member for moving said slice support a fixed distance into toasting position regardless of the extent of movement of said member in setting said timing mechanism and simultaneously energizing said heating means.

10. In an electric toaster, a casing, an article receiving tray shiftable from a non-toasting position to a toasting position relative to said casing, means for latching said tray in toasting position, timing mechanism, latch operating means adapted upon movement in one direction to set said timing mechanism, releasable means for connecting said latch operating means to said timing mechanism, fixed means for actuating said releasable means to release said latch operating means from the timing mechanism after a time predetermined by the initial setting of said timing mechanism, means for causing said latch operating means when released from said timing mechanism to snap said tray latching means out of latching relation, manually operable tray shifting means movable different distances for moving said latch operating means in said one direction to set said timing mechanism, and adjustable means for predetermining the distance of movement of said manually operable means.

11. In an electric toaster, a casing, an article receiving tray shiftable from a non-toasting position to a toasting position relative to said casing, a latch pin carried by said tray, opposed levers spring-urged into engagement with said pin on opposite sides, one of said levers having a latch shoulder overlying the pin when the tray is in toasting position, a timer, a lever connected to said timer and carrying a latch releasing pin engaging said one lever upon termination of the desired toasting interval, a manually operable carriage connected to said timer lever for setting the timer upon depression of said carriage, a system of levers and links connecting said carriage to said tray and including a lost motion connection for permitting movement of said tray and carriage a fixed distance to move said tray into toasting position, and an additional movement of said carriage varying distances in setting said timer, and a rotatably adjustable abutment of varying radius positioned to predetermined the additional movement of said carriage.

12. In an electric toaster, a casing, an article receiving tray shiftable from a non-toasting position to a toasting position relative to said casing, means for latching said tray in toasting position, timing mechanism, latch operating means adapted upon movement in one direction to set said timing mechanism and adapted to move in the opposite direction under the control of said timing mechanism, releasable means for connecting said latch operating means to said timing mechanism for movement in said opposite direction, fixed means for actuating said releasable means to release said latch operating means from the timing mechanism after a time predetermined by the initial setting of said timing mechanism, manually operable means movable different distances for moving said latch operating means in said one direction to set said timing mechanism, adjustable means for predetermining the distance of movement of said manually operable means, and means connecting said manually operable means to said shiftable tray for causing said tray to be shifted to toasting position upon movement of said manually operable means to set said timing mechanism.

13. In an electric toaster, a casing, an article receiving tray rectilinearly shiftable between non-toasting and toasting positions relative to the casing, means for latching said tray in toasting position, said latching means comprising a latch member carried by the tray and opposed latching members between which said tray carried latching member is received in latching position, means for applying opposing forces to said opposed latching members for equalization of the forces exerted on the tray carried latch member, and means for releasing said opposed latching members from said tray carried latch member to release said tray from toasting position.

14. In an electric toaster, a casing, an article receiving tray shiftable between toasting and non-toasting positions relative to the casing, means normally urging said tray to non-toasting position, releasable latch means for latching said tray in toasting position, time controlled mechanism for releasing said latch means, a manually operable member for setting said time controlled mechanism, and means automatically connecting and disconnecting said tray to said manually operable member to move the tray into toasting position during a part of the movement of the manually operable member in setting the time controlled mechanism.

15. In an electric toaster, a slice receiving carriage, a manually operable carriage, means for retaining the slice receiving carriage in toasting position, time control mechanism for releasing said retaining means, means connecting said manually operable carriage to said time control mechanism for setting said time control mechanism upon movement of said manually operable carriage, an operating linkage connected to said slice receiving carriage, means including a lever having a pin and slot connection to said linkage and connected to said manually operable carriage for operating said linkage upon movement of the manually operable carriage, means for maintaining said lever in such position relative to the linkage that movement of the pin in the slot is prevented whereby the linkage is operated with the manually operable carriage, and means for moving said lever relative to the linkage so that the pin moves relatively in the slot as the movement of the manually operable member continues after the tray has been moved to toasting position.

16. In an electric toaster, a casing, an article receiving tray shiftable between toasting and non-toasting positions relative to the casing, manually operable means for shifting the tray between toasting and non-toasting positions; releasable means for retaining the tray in toasting position, means for releasing said retaining means, timing mechanism, means connecting said releasing means to said manually operable means for manual operation of said releasing means, means connecting said timing mechanism to said releasing means for causing movement of said releasing means under the control of said timing mechanism, said last mentioned connecting means including a releasable connection permitting manipulation of said releasing means by said manually operable means to release said retaining means at any selected instant.

JAMES J. GOUGH.

CERTIFICATE OF CORRECTION.

Patent No. 2,257,906.                                           October 7, 1941.

JAMES J. GOUGH.

It is hereby certified that error appears in the printed specification of the above numbered patent requiring correction as follows: Page 2, first column, line 37, for "an" read --on--; page 4, first column, line 16, for the word "carrier" read --carried--; page 6, second column, line 65-66, claim 8, for "carriage" read --holder--; page 7, first column, line 53, claim 11, for "predetermined" read --predetermine--; and that the said Letters Patent should be read with this correction therein that the same may conform to the record of the case in the Patent Office.

Signed and sealed this 9th day of December, A. D. 1941.

Henry Van Arsdale,
(Seal)                                       Acting Commissioner of Patents.